(12) United States Patent
Holder et al.

(10) Patent No.: US 9,281,687 B2
(45) Date of Patent: Mar. 8, 2016

(54) CONTROL SYSTEM FOR ELECTRICAL OUTLETS

(71) Applicants: Ryan Allan Holder, Foster City, CA (US); Nicholas Anthony Consola, San Mateo, CA (US)

(72) Inventors: Ryan Allan Holder, Foster City, CA (US); Nicholas Anthony Consola, San Mateo, CA (US)

(*) Notice: Subject to any disclaimer, the term of this patent is extended or adjusted under 35 U.S.C. 154(b) by 388 days.

(21) Appl. No.: 13/975,540

(22) Filed: Aug. 26, 2013

(65) Prior Publication Data

US 2015/0054341 A1 Feb. 26, 2015

(51) Int. Cl.
*H02J 3/14* (2006.01)
*H02J 3/00* (2006.01)
*H01R 13/66* (2006.01)
*H01R 13/70* (2006.01)
*H01R 24/78* (2011.01)
*H01R 103/00* (2006.01)

(52) U.S. Cl.
CPC .............. *H02J 3/00* (2013.01); *H01R 13/6683* (2013.01); *H01R 13/70* (2013.01); *H01R 24/78* (2013.01); *H01R 2103/00* (2013.01); *Y10T 307/461* (2015.04); *Y10T 307/469* (2015.04)

(58) Field of Classification Search
CPC ... H02J 3/00; Y10T 307/461; Y10T 307/469; H01R 24/78
USPC ......................................................... 307/38, 39
See application file for complete search history.

(56) References Cited

U.S. PATENT DOCUMENTS

| | | | | |
|---|---|---|---|---|
| 7,964,898 B2 * | 6/2011 | Shibayama | ....... | H01L 27/14618 257/222 |
| 2010/0164299 A1 * | 7/2010 | Lee | ........................... | H02J 3/14 307/115 |
| 2013/0140895 A1 * | 6/2013 | Lee | ..................... | H01R 13/6683 307/39 |

* cited by examiner

*Primary Examiner* — Carlos Amaya
(74) *Attorney, Agent, or Firm* — Plager Schack LLP

(57) ABSTRACT

A system for controlling electrical outlets includes two devices. The first device connects to a switched outlet and sends a signal to the second device when the outlet is turned on or off. The second device mimics the power state of the first device. The first device may include a socket for receiving a sensor module, which may alter the functionality of the device. For example, the device may be controlled by a remote device or it may be motion-activated, depending on the module that is connected.

3 Claims, 5 Drawing Sheets

CONTROL SYSTEM FOR ELECTRICAL OUTLETS

BACKGROUND

The embodiments herein relate generally to system for controlling one or more electrical outlets.

Homes and offices include one or more electrical outlets that are controlled by a switch. While the switch is often located in a convenient place, the switched outlet may be located in an area that is less than desirable. For example, a user may want to have a light controlled by a switch, but the switched outlet is located on the opposite side of the room from where the user wants to put the lamp. Current solutions to this problem rely on plugging a remote-controlled unit into an always-on electrical outlet. The unit is controlled by a remote control unit, which switches the output of the unit on and off. The remote control is a separate unit which may be mounted on a wall, attached to a key chain, or so on. Alternatively, the remote control is a software application running on a mobile device or computer. In this case, the remote control requires a wireless network to connect to the unit. In some cases, an Internet connection is also required. Current solutions do not provide a way to control an always-on outlet with an existing switch. Current solutions also do not provide a means for controlling a switch based on an input other than the remote control.

SUMMARY

One embodiment of the present invention includes a system for controlling an electrical outlet, which includes two devices. The first device includes a first connector, a first device outlet, and a first transceiver. The first connector is located on a surface of a first housing and is configured to connect to a first fixed outlet. The first connector is configured to receive electrical power from the first fixed outlet, which includes a standardized alternating current (AC) outlet. The first device outlet is located on a surface of the housing and includes a standardized AC outlet. The first device outlet is configured to have a powered state with the first connector has a powered state and to have an unpowered state when the first connector has an unpowered state. The first transceiver is located within the first housing, and it is connected to the first connector and to the first device outlet.

The second device includes a second connector, a second device outlet, and a second transceiver. The second connector is located on a surface of a second housing. The second connector is configured to connect to a second fixed outlet and to receive electrical power from the second fixed outlet, which includes a standardized AC outlet. The second outlet is located on a surface of the housing and includes a standardized AC electrical outlet. The second transceiver is located within the second housing and is connected to the second connector and to the second device outlet.

The first transceiver is configured to send a signal to the second transceiver, and the second transceiver is configured to receive a signal from the first transceiver. The first transceiver is configured to send a first signal, which is indicative of a powered state, and a second signal, which is indicative of an unpowered state, to the second transceiver. The second transceiver is configured to activate the second device outlet after receive the first signal and to deactivate the second device outlet after receiving the second signal.

Another embodiment of the present disclosure includes a device for controlling an electrical outlet. The device includes a connector, a device outlet, a transceiver, a socket, and a processor. The transceiver is located within the housing. The connector is located on a surface of a housing and is configured to connect to a fixed outlet. The connector is configured to receive electrical power from the fixed outlet and includes a standardized AC connector. The device outlet is located on a surface of the housing and includes a standardized AC outlet. The socket is located on a surface of the housing and is configured to receive a module. The processor is located within the housing. It is programmed to activate the device outlet, deactivate the device outlet, or both. Activating and deactivating the device outlet is based on at least one of a signal received from the connector, a signal received from the transceiver, and a signal received from the socket.

BRIEF DESCRIPTION OF THE FIGURES

The detailed description of some embodiments of the present invention is made below with reference to the accompanying figures, wherein like numerals represent corresponding parts of the figures.

DETAILED DESCRIPTION OF CERTAIN EMBODIMENTS

Figure 1:
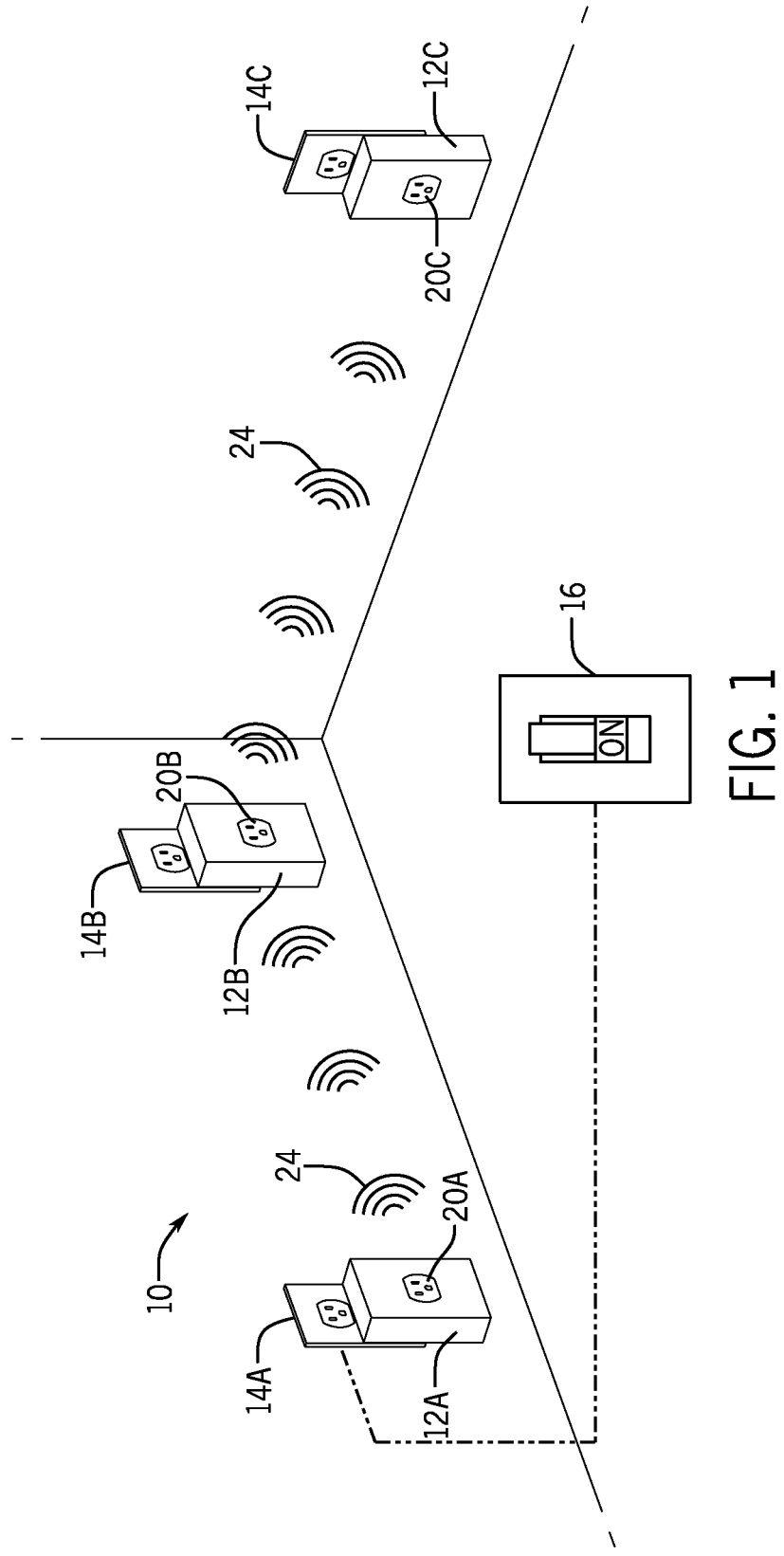
FIG. 1 shows a schematic perspective view of an embodiment of the present invention.

By way of example, and referring to FIG. 1, one embodiment of the present invention includes a control system for electrical outlets 10. The system 10 may include one or more control devices 12 connected to one or more fixed electrical outlets 14. For example, outlet 14A may be a switched outlet, which may be controlled by switch 16. Outlets 14B and 14C may both be always-on outlets, which may provide electricity during normal operations. Devices 12 may include a connector 18 for connecting to an outlet 14 and a device outlet 20 for receiving a compatible electrical plug from a device or appliance, such as, e.g., a lamp, a television, a stereo, a recharger, and so on. When switch 16 is turned to an "on" position and current is supplied to outlet 14A, device 12A may activate its device outlet 20A.

The devices 12 may include transceivers 22. Device 12A may be configured as a primary or master device, and device 12B and 12C may be configured as secondary or slave devices. For example, device 12A may have a unique identifier which may be cloned, copied, or programmed into devices 12B and 12C. When outlet 14A is turned on, device 12A may send a signal 24 using its transceiver. Devices 12B and 12C may receive the signal 24, which may include device 12A's unique identifier and an activation instruction. Since devices 12B and 12C may be configured as secondary devices under the control of device 12A, receiving the signal 24 may cause devices 12B and 12C to activate their device outlets 20B and 20C.

Figure 2:
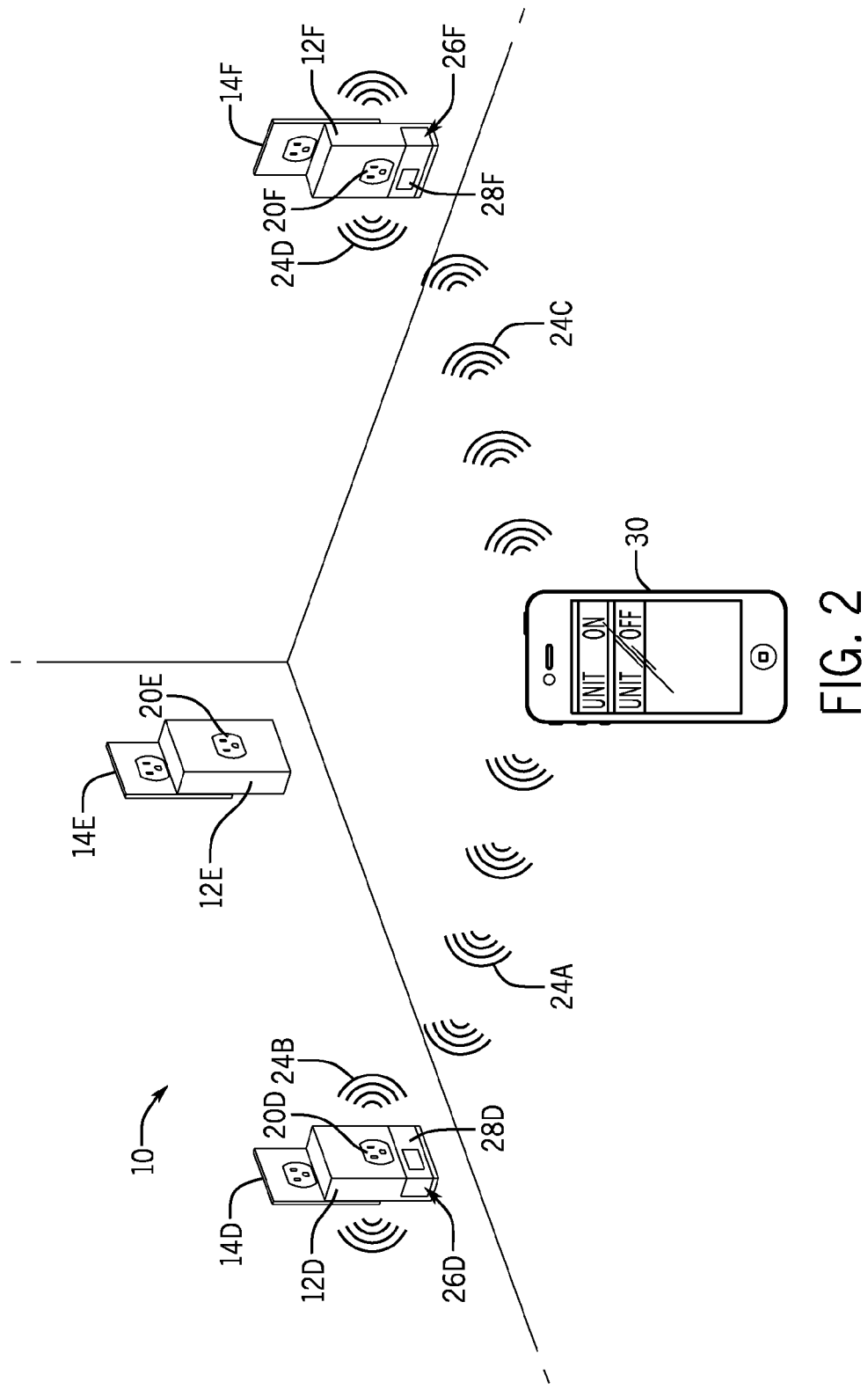
FIG. 2 shows a schematic perspective view of an embodiment of the present invention.

Referring to FIG. 2, devices 12D and 12F may include sockets 26D and 26F for receiving modules 28D and 28F. When a module 28 is inserted into a socket 26 in a device 12, the device 12 may be controlled by the module 28 regardless of its previous assignment as either a primary or secondary device. For example, modules 28D and 28F may be configured to be controlled by a remote device 30, such as a smartphone, laptop, or the like. With modules installed, both devices 12D and 12F are primary devices, and device 12E may be configured as a secondary device to device 12D. Electrical outlets 14D, 14E, and 14F may be always-on outlets. The remote device 30 may send a signal 24A to activate device 12D. After receiving the signal 24A, device 12D may send an activation signal 24B to activate its secondary devices, including device 12E. The remote device 30 may also send a signal 24C to deactivate device 12F. After receiving the signal 24C, device 12F may send a signal 24D to deactivate its secondary devices. As there are no devices 12 in this example that are secondary to device 12F, signal 24D may have no effect.

Figure 3:
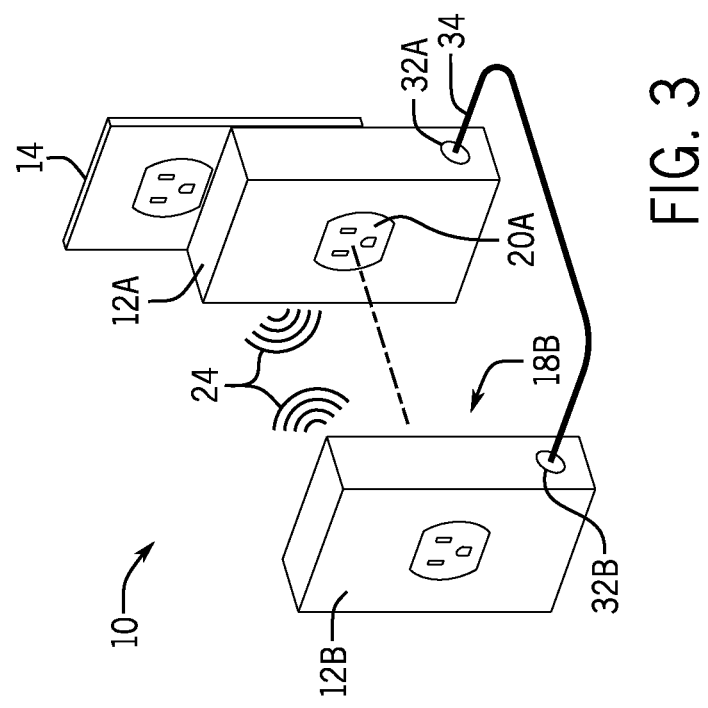
FIG. 3 shows a schematic perspective view of an embodiment of the present invention.

Referring to FIG. 3, a device 12B may be connected to a primary device 12A to be configured as a secondary to the primary device 12A. This configuration may include copying, cloning, or programming the secondary device 12B with a unique identifier of the primary device 12A. For example, devices 12A and 12B may have cloning sockets 32A and 32B. When the cloning sockets 32A and 32B are interconnected with a cloning cable 34, the unique identifier of device 12A may be copied or cloned to device 12B. Device 12B may retain its original unique identifier, but this identifier may be deactivated or suppressed in favor of the identifier from the primary device. Alternatively, device 12B may wirelessly copy or clone the identifier from device 12A when the devices are bought into proximity of one another. For example, signals 24 may be used to transmit the identifier from device 12A to device 12B. Suitable wireless protocols include, for example, near-field communication (NFC), Bluetooth, Wi-Fi, radio frequency identification (RFID), and so on. As an additional alternative, device 12B may clone an identifier from device 12A over a power line connector. For example, power line communication protocols are well known in the art. When device 12B is connected to an outlet 14, and device 12A is connected to a second outlet 14, device 12B may be able to clone an identifier from device 12A. For example, a clone button may be pressed first on the primary device 12A, and then a clone button may be pressed on all secondary devices, include device 12B. Cloning may also take place if connector 18B of device 12B is plugged into outlet 20A on device 12A. In this scenario, cloning may be effected by power line communication or proximity-based wireless communication.

Figure 4:
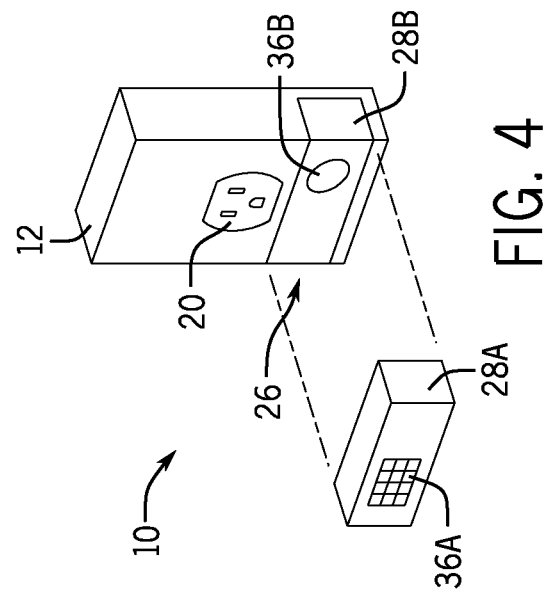
FIG. 4 shows a schematic perspective view of an embodiment of the present invention.

Referring to FIG. 4, a device 12 may include a socket 26 for receiving a module 28. When the socket 26 is empty, the device 12 may function as either a primary or secondary device, as discussed above. When a module 28 is installed in the socket 26, the device 12 may function as a primary device. In other words, activation or deactivation of the device outlet 20 may be controlled by the module 28, not by another device 12 or an outlet 14. The module 28 may include one or more sensors 36, which may extend or enhance the functionality of the device 12 receiving the module 28. Example sensors 36 include, without limitation, a light sensor, a sound sensor, a motion detector, an infrared sensor, a Bluetooth radio, a Wi-Fi transceiver, a smoke detector, a carbon monoxide detector, and so on. The module 28 may carry additional software functionality. For example, a module may instruct the device 12 into which it is inserted to not repeat a signal 24, thus breaking an activation chain or hierarchy as described below. Additional functionality options are contemplated.

Figure 5:
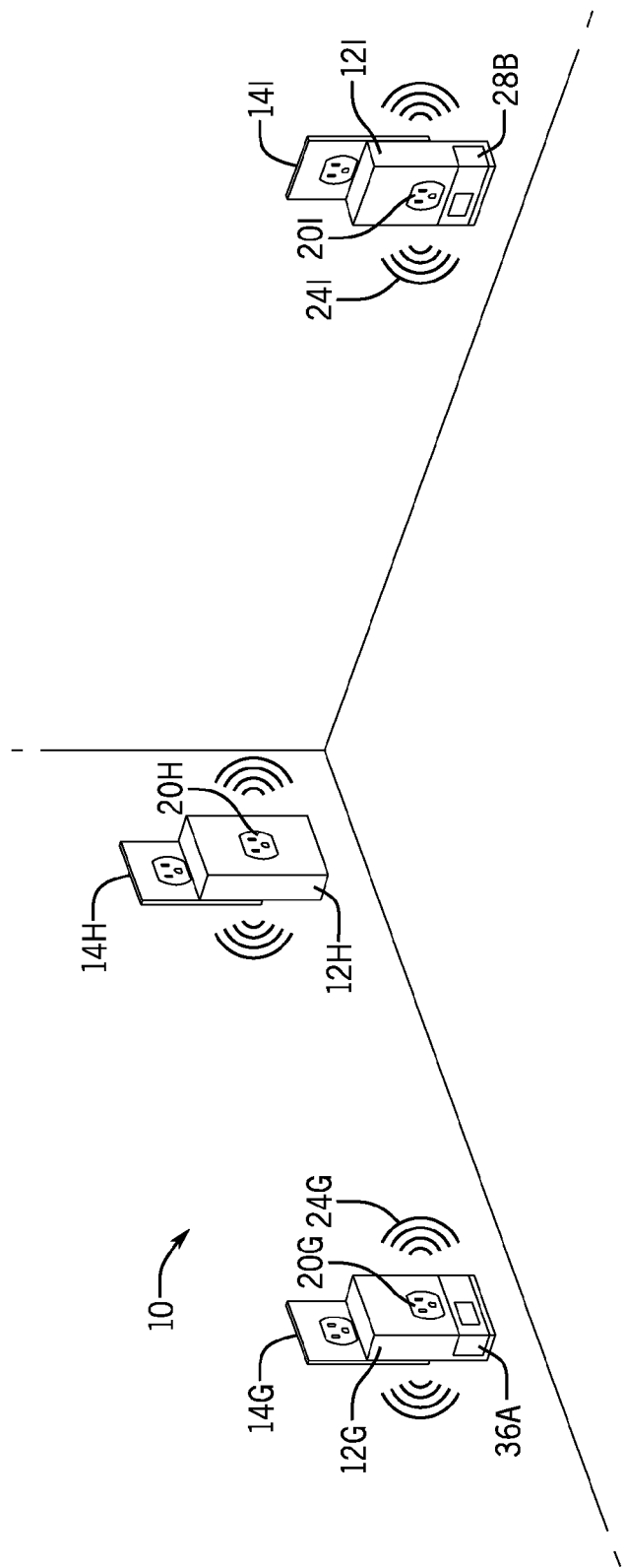
FIG. 5 shows a schematic perspective view of an embodiment of the present invention.

Referring to FIG. 5, for example, a motion sensor 36A may be connected to a device 12G. The motion sensor 36A may be configured so that it activates device 12G when it detects motion and it deactivates the device 12G when no motion is detected for a pre-determined period, such, e.g., 5 minutes. If a lamp or other illumination source is connected to the device outlet 20G, then a motion-activated lighting solution can be created. Device 12G may transmit a signal 24G. The signal 24G may activate device 12H, which may be configured as a secondary device to device 12G. If a lamp is connected to device outlet 20H, the motion-activated lighting solution may be extended to multiple lamps. A Wi-Fi module 28B may be plugged into device 12I, which may allow a lamp or other appliance connected to device outlet 20I to be controlled by a user's remote device 30. After receiving a signal from the remote device 30, the device 12I may generate a signal 24I to activate or deactivate any associated secondary devices.

If the user goes out of town, they may replace the motion detector module 28A with a light sensor module 28. When the sun goes down and ambient light levels in the room decrease, the light sensor 36 and module 28 may activate the device 12G (and any secondary devices 12H). At dawn, the module 28 may deactivate the device 12G (and any secondary devices 12H). This arrangement may give the appearance that someone is home when the house is actually unoccupied. Thus, the motion-activated solution may be easily and quickly converted to a light-activated solution.

As described above, a device 12 may be configured as secondary to another device 12. The second device 12, to which the first device 12 is slaved, may also be configured as secondary to a third device 12. It is possible to have a chain or hierarchy of devices 12 with multiple levels. When the primary device 12 is activated, it may send a signal to its secondary devices 12, and the secondary devices 12 may send signals to their corresponding secondary devices, and so on down the hierarchy of devices 12. This configuration may be visualized as a tree, star, or hub-and-spoke topology. This configuration may allow the network or chain of devices 12 to extend beyond the broadcast range of the master device 12's transceiver.

Figure 6A:
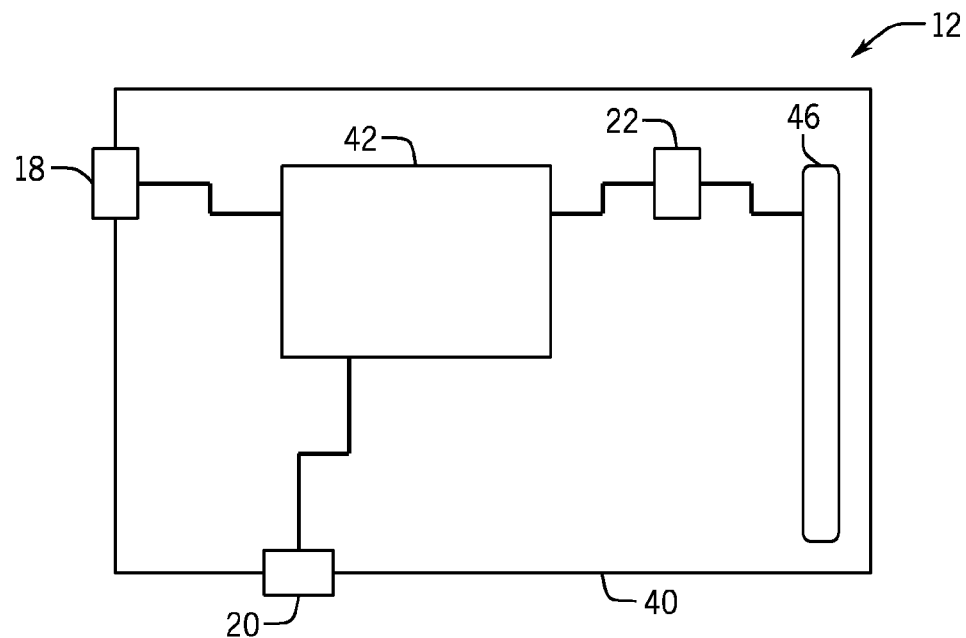
FIGS. 6A and 6B show schematic block diagrams of certain embodiments of the present invention.
Figure 6B:
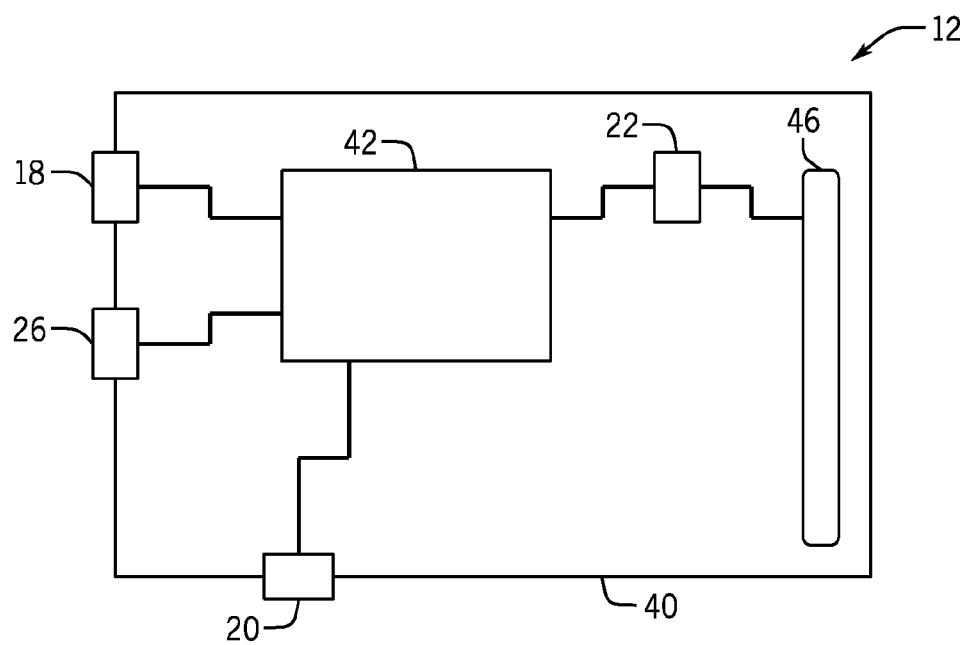

Referring to FIGS. 6A and 6B, a device may include a housing 40 with one or more surfaces. Connector 18, device outlet 20, and socket 26 may be located on one or more surfaces of the housing 40. A processor 42 may be programmed to control one or more of the connector 18, the device outlet 20, and the socket 26. The processor may control the transceiver 22 for sending and receiving activation and/or deactivation signals. The transceiver 22 may include an antenna 46, which may be located inside the housing 40, outside the housing 40, or both.

Persons of ordinary skill in the art may appreciate that numerous design configurations may be possible to enjoy the functional benefits of the inventive systems. Thus, given the wide variety of configurations and arrangements of embodiments of the present invention the scope of the present invention is reflected by the breadth of the claims below rather than narrowed by the embodiments described above.

What is claimed is:

1. A system for controlling an electrical outlet, the system comprising:
   a first device comprising:
   a first cloning device;
   a first connector disposed on a surface of a first housing, the first connector configured to connect to a first fixed outlet and to receive electrical power from the first fixed outlet, the first fixed outlet comprising a standardized alternating current (AC) electrical outlet;
   a first device outlet disposed on a surface of the first housing, the first device outlet comprising a standardized AC electrical outlet, the first device outlet configured to have a powered state when the first connector has a powered state, the first device outlet further configured to have an unpowered state when the first connector has an unpowered state; and a first transceiver disposed within the first housing and connected to the first connector and to the first device outlet; and a second device comprising:

a second cloning system configured to connect to the first cloning system;

a second connector disposed on a surface of a second housing, the second connector configured to connect to a second fixed outlet and to receive electrical power from the second fixed outlet, the second fixed outlet comprising a standardized AC electrical outlet;

a second device outlet disposed on a surface of the second housing, the second device outlet comprising a standardized AC electrical outlet; and a second transceiver disposed within the second housing and connected to the second connector and to the second device outlet;

wherein:

the first transceiver is configured to send a first signal to the second transceiver, the first signal indicative of the first connector having a powered state;

the second transceiver is configured to activate the second device outlet after receiving the first signal;

first transceiver is configured to send a second signal to the second transceiver, the second signal indicative of the first connector having a unpowered state;

the second transceiver is configured to deactivate the second device outlet after receiving the second signal; and wherein the second device is configured to receive a unique identifier from the first device when the second cloning system is connected to the first cloning system, the unique identifier configured to limit the second device to being controlled by the first device based on a cloning based signal received from the first device.

2. The system of claim 1, wherein the first device comprises a first processor connected to the first connector, the first device outlet, and the first transceiver, the first processor programmed to control the first transceiver and the power state of the first device outlet; and the second device comprises a second processor connected to the second connector, the second device outlet, and the second transceiver, the second processor programmed to control the second transceiver and the power state of the second device outlet.

3. The system of claim 1, wherein the first cloning system comprises a first cloning socket configured to receive a cloning cable; and the second cloning system comprises a second cloning socket configured to receive a cloning cable.

\* \* \* \* \*